(12) United States Patent
Takehara et al.

(10) Patent No.: US 12,335,585 B2
(45) Date of Patent: *Jun. 17, 2025

(54) MACHINE LEARNING DEVICE AND IMAGE PROCESSING DEVICE

(71) Applicant: JVCKENWOOD Corporation, Yokohama (JP)

(72) Inventors: Hideki Takehara, Yokohama (JP); Shingo Kida, Yokohama (JP); Yincheng Yang, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 103 days.

This patent is subject to a terminal disclaimer.

(21) Appl. No.: 18/173,816

(22) Filed: Feb. 24, 2023

(65) Prior Publication Data

US 2023/0199280 A1    Jun. 22, 2023

Related U.S. Application Data

(63) Continuation of application No. PCT/JP2021/003569, filed on Feb. 1, 2021.

(30) Foreign Application Priority Data

Aug. 26, 2020 (JP) ................. 2020-142708

(51) Int. Cl.
    *H04N 23/11*    (2023.01)
    *G06V 10/70*    (2022.01)
(52) U.S. Cl.
    CPC ............. *H04N 23/11* (2023.01); *G06V 10/70* (2022.01)
(58) Field of Classification Search
    CPC .................. H04N 23/11; G06V 10/70
    See application file for complete search history.

(56) References Cited

U.S. PATENT DOCUMENTS

| 2019/0065859 A1* | 2/2019 | Togashi | G06T 7/215 |
| 2019/0349572 A1* | 11/2019 | Uemori | G06V 10/454 |
| 2020/0193569 A1* | 6/2020 | Aoki | G06T 5/50 |

FOREIGN PATENT DOCUMENTS

| JP | 2006-333337 A | 12/2006 |
| JP | 2008302746 A * | 12/2008 |

(Continued)

OTHER PUBLICATIONS

Extended European Search Report from EP Application No. 21860801.6 mailed Dec. 18, 2023, 9 pages.

(Continued)

*Primary Examiner* — Zhubing Ren
(74) *Attorney, Agent, or Firm* — Shih IP Law Group, PLLC

(57) ABSTRACT

A far-infrared image training data acquisition unit acquires a far-infrared image in a first predetermined time zone. A visible light image training data acquisition unit acquires a visible light image in a second predetermined time zone. A visible light image generation model training unit machine-learns the far-infrared image in the first predetermined time zone and the visible light image in the second predetermined time zone as training data by a generative adversarial network, and generates a trained generation model, which generates the visible light image in the second predetermined time zone from the far-infrared image in the first predetermined time zone. Through machine learning by a generative adversarial network, the visible light image generation model training unit further generates a trained identification model, which identifies whether or not the far-infrared image is a far-infrared image captured in the first predetermined time zone.

3 Claims, 10 Drawing Sheets

(56) References Cited

FOREIGN PATENT DOCUMENTS

| JP | 2016-122905 A | 7/2016 |
| JP | 2019-046276 A | 3/2019 |
| JP | 2019-071050 A | 5/2019 |
| JP | 6663524 B1 | 3/2020 |
| WO | 2019/176235 A1 | 9/2019 |

OTHER PUBLICATIONS

S. Liu, et al., "IR2VI: Enhanced Night Environmental Perception by Unsupervised Thermal Image Translation", 2018 IEEE/CVF Conference on Computer Vision and Pattern Recognition Workshops, 8 pages.

International Preliminary Report on Patentability from International Application No. PCT/JP2021/003569 mailed Feb. 28, 2023, 10 pages.

International Search Report from International Application No. PCT/JP2021/003569 mailed Apr. 20, 2021, 6 pages.

\* cited by examiner

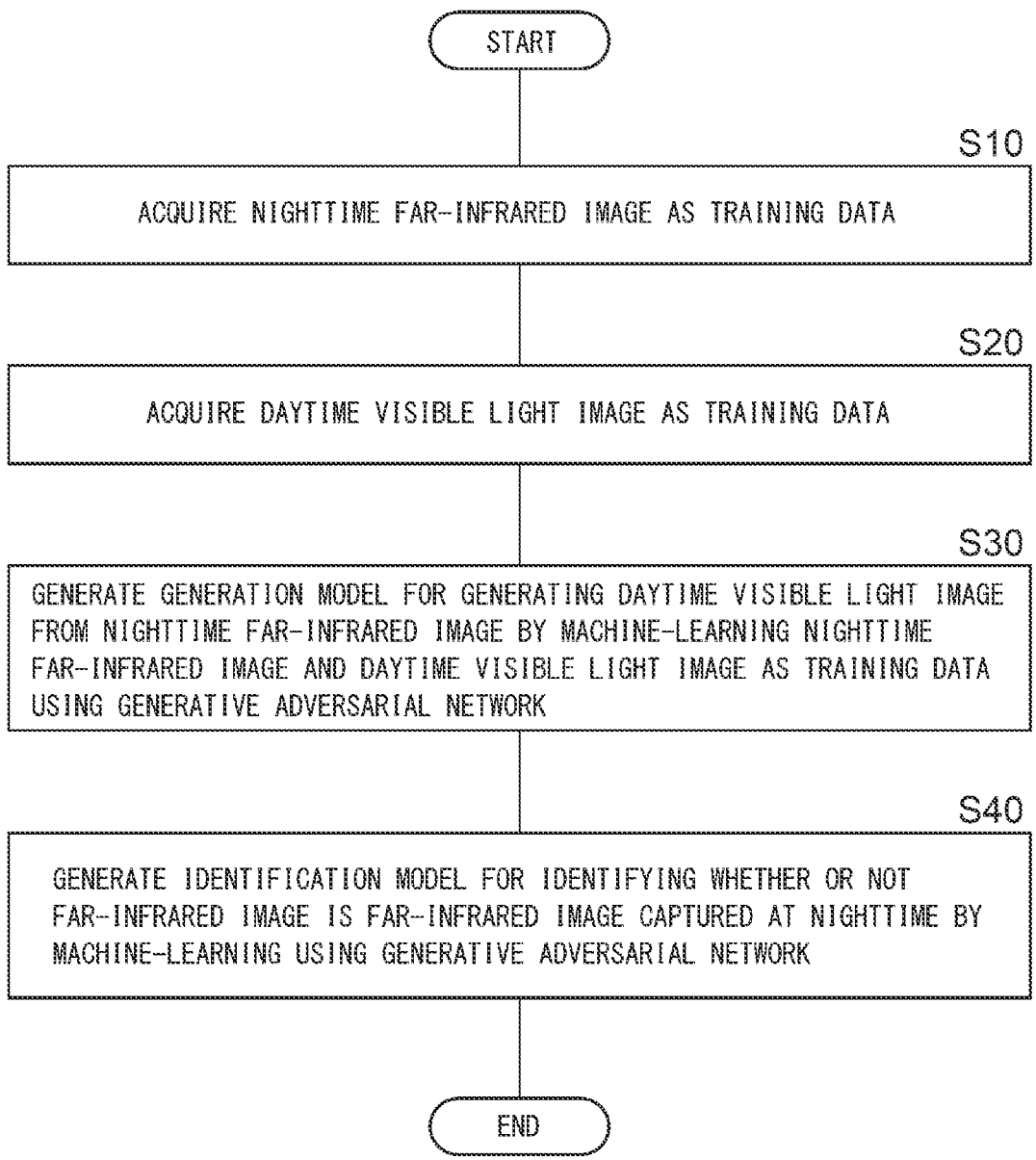

FIG. 6A

| 6 A.M. | 9 A.M. | 12 P.M. | 3 P.M. | 6 P.M. | 9 P.M. | 12 A.M. | 3 A.M. | 6 A.M. |

DAY TIME ZONE (approx. 10 A.M. – 4 P.M.)

NIGHT TIME ZONE 1 (approx. 6 P.M. – 8 P.M.)

NIGHT TIME ZONE 2 (approx. 10 P.M. – 4 A.M.)

FIG. 6B

| 6 A.M. | 9 A.M. | 12 P.M. | 3 P.M. | 6 P.M. | 9 P.M. | 12 A.M. | 3 A.M. | 6 A.M. |

DAY TIME ZONE 1

DAY TIME ZONE 2

DAY TIME ZONE 3

NIGHT TIME ZONE 1

NIGHT TIME ZONE 2

MACHINE LEARNING DEVICE AND IMAGE PROCESSING DEVICE

BACKGROUND OF THE INVENTION

1. Field of the Invention

The present invention relates to a technique for converting a far-infrared image into a visible light image.

2. Description of the Related Art

Visible light cameras are vulnerable to fog and haze and cannot capture images of people and animals at night without a light source. On the other hand, far-infrared cameras are resistant to fog and haze and can vaguely capture images of people and animals even in places with no light source, e.g., at night time, but it is difficult to recognize people and animals.

At night when there is no visible light, an infrared camera is used instead of a visible light camera to capture an image of an object. However, since far-infrared images do not include color image information, it is difficult to detect a specific object such as a person from far-infrared images. Therefore, a far-infrared image is converted into a visible light image in order to allow for easy recognition through human eyes.

In Patent Literature 1, an image processing device is disclosed in which a generating unit generates a color image by predicting the color of an object based on an infrared image and a control unit determines a candidate color based on the reliability of each color related to the prediction.

[Patent Literature 1] Japanese Patent Application Publication No. 2016-122905

In order to convert an infrared image into a visible light image, it is necessary to accurately specify a color value for the pixel value of the infrared image, and there is a limit to improving the accuracy. Also, it is difficult to convert a nighttime infrared image into a daytime color image.

SUMMARY OF THE INVENTION

In this background, a purpose of the present invention is to provide a technique that allows for conversion of a far-infrared image into a visible light image with high accuracy.

A machine learning device according to one embodiment of the present invention includes: a far-infrared image training data acquisition unit that acquires a far-infrared image in a first predetermined time zone; a visible light image training data acquisition unit that acquires a visible light image in the second predetermined time zone; and a visible light image generation model training unit that machine-learns the far-infrared image in the first predetermined time zone and the visible light image in the second predetermined time zone as training data by a generative adversarial network, and generates a trained generation model that generates the visible light image in the second predetermined time zone from the far-infrared image in the first predetermined time zone.

Another embodiment of the present invention relates to an image processing device. This device includes: a far-infrared image acquisition unit that acquires a far-infrared image; a visible light image generation unit that inputs the acquired far-infrared image into a generation model trained by machine learning of a far-infrared image in a first predetermined time zone and a visible light image in a second predetermined time zone as training data by a generative adversarial network, and generates a visible light image in the second predetermined time zone; and a far-infrared image identification unit that inputs the acquired far-infrared image into an identification model that identifies whether or not the far-infrared image generated by the machine learning using the generative adversarial network is a far-infrared image captured in the first predetermined time zone. The visible light image generation unit generates the visible light image if the far-infrared image is determined to be a far-infrared image captured in the first predetermined time zone by the far-infrared image identification unit and does not generate the visible light image if the far-infrared image is determined not to be a far-infrared image captured in the first predetermined time zone.

Still another embodiment of the present invention relates to a machine learning device. This device includes: a far-infrared image acquisition unit that acquires a far-infrared image; a visible light image generation unit that inputs the acquired far-infrared image into a generation model trained by machine learning of a far-infrared image in a first predetermined time zone and a visible light image in a second predetermined time zone as training data by a generative adversarial network, and generates a visible light image in the second predetermined time zone; an object detection model training unit that performs machine learning on an object detection model using the generated visible light image as training data; and a visible light image identification unit that inputs the generated visible light image into an identification model that identifies whether or not the visible light image generated by the machine learning using the generative adversarial network is normal. The object detection model training unit uses the generated visible light image as the training data if the generated visible light image is determined to be normal by the visible light image identification unit and does not use the generated visible light image as the training data if the generated visible light image is determined to be not normal.

Optional combinations of the aforementioned constituting elements and implementations of the invention in the form of methods, apparatuses, systems, recording mediums, and computer programs may also be practiced as additional modes of the present invention.

BRIEF DESCRIPTION OF THE DRAWINGS

FIG. 4 is a flow chart explaining a procedure for performing machine learning on a generation model for a visible light image generative network and an identification model for a far-infrared image discriminative network by a machine learning device of FIG. 1;

FIG. 6A and FIG. 6B are diagrams explaining divided predetermined time zones;

DETAILED DESCRIPTION OF THE INVENTION

The invention will now be described by reference to the preferred embodiments. This does not intend to limit the scope of the present invention, but to exemplify the invention.

First Embodiment

Figure 1:
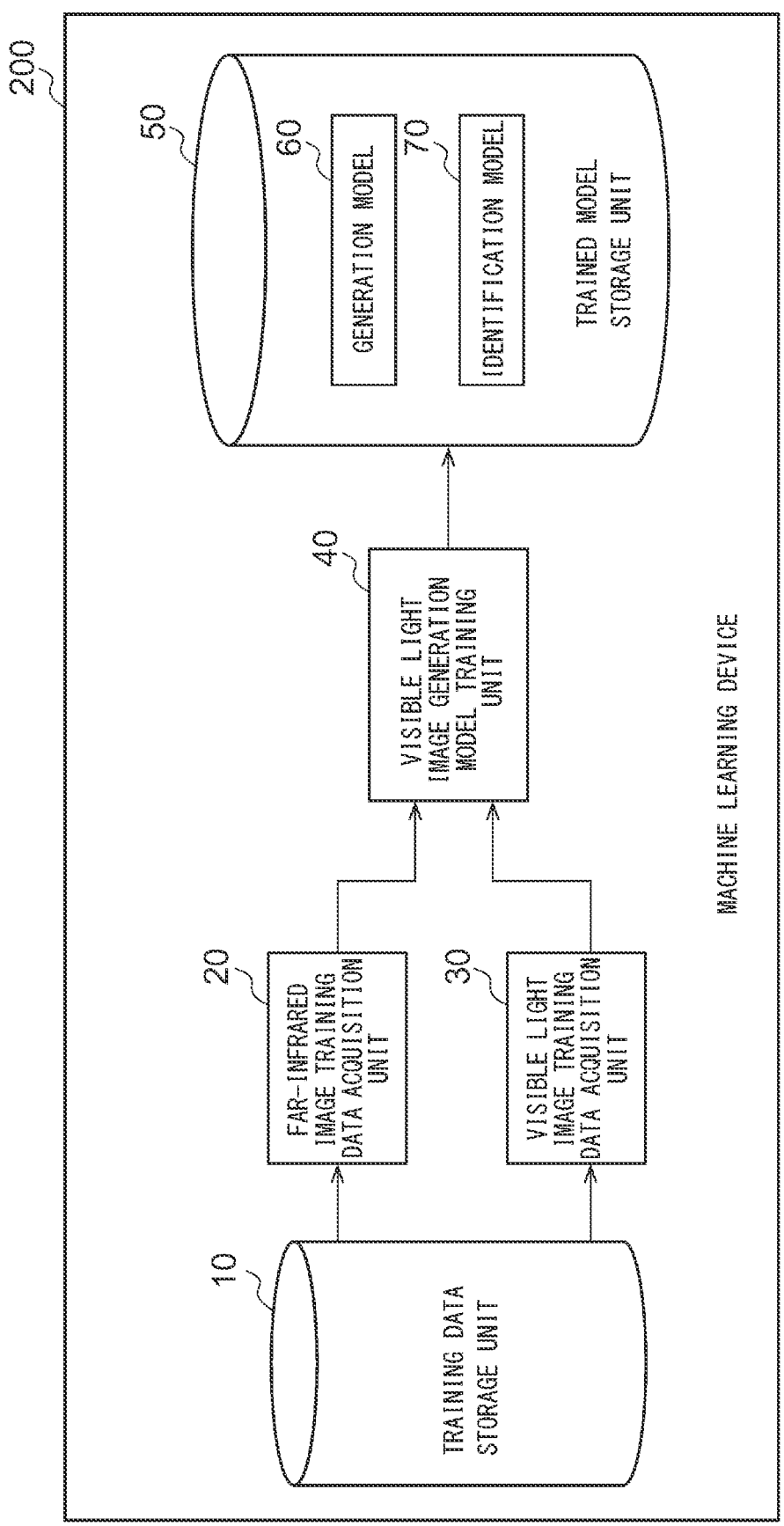
FIG. 1 is a configuration diagram of a machine learning device according to the first embodiment.

FIG. 1 is a configuration diagram of a machine learning device 200 according to the first embodiment. The machine learning device 200 includes a training data storage unit 10, a far-infrared image training data acquisition unit 20, a visible light image training data acquisition unit 30, a visible light image generation model training unit 40, and a trained model storage unit 50.

The wavelength range of visible light is 380 to 780 nm, and the wavelength range of far-infrared light is 8 to 15 μm. Visible light allows humans to see objects such as people, animals, and license plates in detail with their eyes. Visible light cameras have issues of not being good with image capturing with backlighting, being vulnerable to fog and haze, and not being able to capture images of objects at night without a light source.

On the other hand, far-infrared cameras are resistant to fog and haze and can vaguely capture images of objects even in places with no light source, e.g., at night time. However, far-infrared cameras have issues such as difficulty in accurately recognizing objects, low resolution, and large distortion because far-infrared cameras cannot capture images of objects in detail.

Here, images captured by a far-infrared image capturing device are referred to as far-infrared images, and images captured by a visible light image capturing device are referred to as visible light images. It is known that there is a correlation between far-infrared images and visible light images.

Training data for a large number of far-infrared images in all time zones and training data for a large number of visible light images in all time zones are stored in the training data storage unit 10.

The far-infrared image training data acquisition unit 20 acquires a far-infrared image in a first predetermined time zone from the training data storage unit 10 as training data and supplies the far-infrared image to the visible light image generation model training unit 40. The visible light image training data acquisition unit 30 acquires a visible light image in a second predetermined time zone from the training data storage unit 10 as training data and supplies the visible light image to the visible light image generation model training unit 40.

The far-infrared image in the first predetermined time zone and the visible light image in the second predetermined time zone are generally different in terms of image composition, i.e., the arrangement of people and objects to be captured due to different image-capturing time zones. However, there is also a combination where the far-infrared image in the first predetermined time zone and the visible light image in the second predetermined time zone have the same image composition if, for example, the arrangement of the objects does not change during the day. As an example, the first predetermined time zone represents nighttime, and the second predetermined time zone represents daytime.

The visible light image generation model training unit 40 generates a trained visible light image generation model that generates a visible light image in the second predetermined time zone from the far-infrared image in the first predetermined time zone. More specifically, using generative adversarial networks (GANs), the visible light image generation model training unit 40 performs machine learning on a visible light image generative network that generates a visible light image upon the input of a far-infrared image and a far-infrared image discriminative network that identifies upon the input of a far-infrared image whether the input far-infrared image is real or fake as the far-infrared image in the first predetermined time zone, using the far-infrared image in the first predetermined time zone and the visible light image in the second predetermined time zone as training data.

As a result of learning through a GAN, a generation model 60, which is a trained model of the visible light image generative network, and an identification model 70, which is a trained model of the far-infrared image discriminative network, are generated. The generation model 60 is a trained model of the visible light image generative network that generates the visible light image in the second predetermined time zone from the far-infrared image in the first predetermined time zone, and the identification model 70 is a trained model of the far-infrared image discriminative network that identifies whether or not the far-infrared image is a far-infrared image captured during the first predetermined time zone. The visible light image generation model training unit 40 stores the generation model 60 and the identification model 70 in the trained model storage unit 50.

A GAN will be explained now. A GAN is a form of machine learning. A GAN is a machine learning model that allows for adversarial learning of a generative network and a discriminative network so as to improve the performance of both networks. As a result of the learning, a trained model of the generative network and a trained model of the discriminative network can be obtained.

The generative network is a neural network that, upon the input of an input signal such as random noise, generates a new image based on the features of a learned image.

The discriminative network is a neural network that, upon the input of an image, identifies whether the input image is a real image (in other words, a target image) or a fake image (in other words, an image generated by the generative network).

Pix2Pix and Cycle GAN will be each explained as GAN learning methods.

Pix2Pix is a GAN that allows for one-by-one adversarial learning of one each of a generative network that generates generative image data upon the input of input image data and a discriminative network that identifies whether the input image data is target image data (i.e., real) or generative image data (i.e., fake) generated by the generative network. In Pix2Pix, as a result of learning, one set of trained models of the generative and discriminative networks can be obtained.

In Pix2Pix, input image data included in Group X and target image data included in Group Y are learned as a one-to-one pair, and the features (conversion characteristics) to be converted from Group X to Group Y are learned by the generative network.

In Pix2Pix, contour information of the pair of input image data and target image data needs to match. This is because Pix2Pix predicts texture information of the inside of a contour.

When the input image data in Group X is input to the trained model of the generative network that has learned conversion characteristics, the generative network generates generative image data with the features of Group Y.

Adversarial learning is performed here in which the generative network is learned such that the generated generative image data is identified as real by the discriminative network while the discriminative network is trained to be able to identify that the generative image data generated by the generative network is fake.

Cycle GAN is a GAN that allows for adversarial learning of two each of generative networks that generate target image data upon the input of input image data and discriminative networks that identify whether the input image data is the target image data (i.e., real) or generative image data (i.e., fake) generated by the generative network. In Cycle GAN, as a result of learning, two sets of trained models of the generative and discriminative networks can be obtained.

In Cycle GAN, input image data included in Group X and target image data included in Group Y are learned in an unpaired manner, and while features (conversion characteristics) to be converted from Group X to Group Y are learned by a first generative network, input image data included in Group Y and target image data included in Group X are learned in an unpaired manner, and features (conversion characteristics) to be converted from Group Y to Group X are learned by a second generative network.

Further, the input image data in Group X is input to the first generative network that has learned the conversion characteristics from Group X to Group Y so as to generate generative image data with the features of Group Y. This generative image data is input to the second generative network that has learned the conversion characteristics from Group Y to Group X, and generative image data generated as a result thereof is trained to return to the input image data in Group X. In parallel, the input image data in Group Y is input to the second generative network that has learned the conversion characteristics from Group Y to Group X so as to generate generative image data with the features of Group X. This generative image data is input to the first generative network that has learned the conversion characteristics from Group X to Group Y, and generative image data generated as a result thereof is trained to return to the input image data in Group Y. In other words, learning is performed taking into account the interconvertibility of Group X and Group Y in Cycle GAN, and the higher the correlation between Group X and Group Y becomes, the more effectively the conversion can be performed.

The generative image data generated by the first generative network and the image data in Group Y are input to a first discriminative network so as to train the first discriminative network to be able to identify whether an image input to the first discriminative network is real (i.e., image data in Group Y) or fake (i.e., generative image data generated by the first generative network).

Further, the generative image data generated by the second generative network and the image data in Group X are input to a second discriminative network so as to train the second discriminative network to be able to identify whether an image input to the second discriminative network is real (i.e., image data in Group X) or fake (i.e., generative image data generated by the second generative network).

The first generative network is trained such that the generated generative image data is identified as real by the first discriminative network.

Further, the second generative network is trained such that the generated generative image data is identified as real by the second discriminative network.

In Cycle GAN, input image data and target image data are unpaired, and the contour information thereof does not need to match. This is because Cycle GAN predicts texture information of the inside of a contour while predicting the contour.

When the input image data in Group X is input to the trained model of the first generative network that has learned conversion characteristics, the generative network generates generative image data with the features of Group Y.

When the input image data in Group Y is input to the trained model of the second generative network that has learned conversion characteristics, the generative network generates generative image data with the features of Group X.

As described above, Pix2Pix and Cycle GAN can train a generative network that generates images with the features of Group Y from Group X images.

For example, if an image in Group X is an edge image of a bag and an image in Group Y is a photo image of the bag, a generative network can be trained to output the photo image upon the input of the edge image.

In the first embodiment, Cycle GAN is used as a GAN. In the explanation of Cycle GAN above, Group X includes far-infrared images and Group Y includes visible light images.

Figure 2:
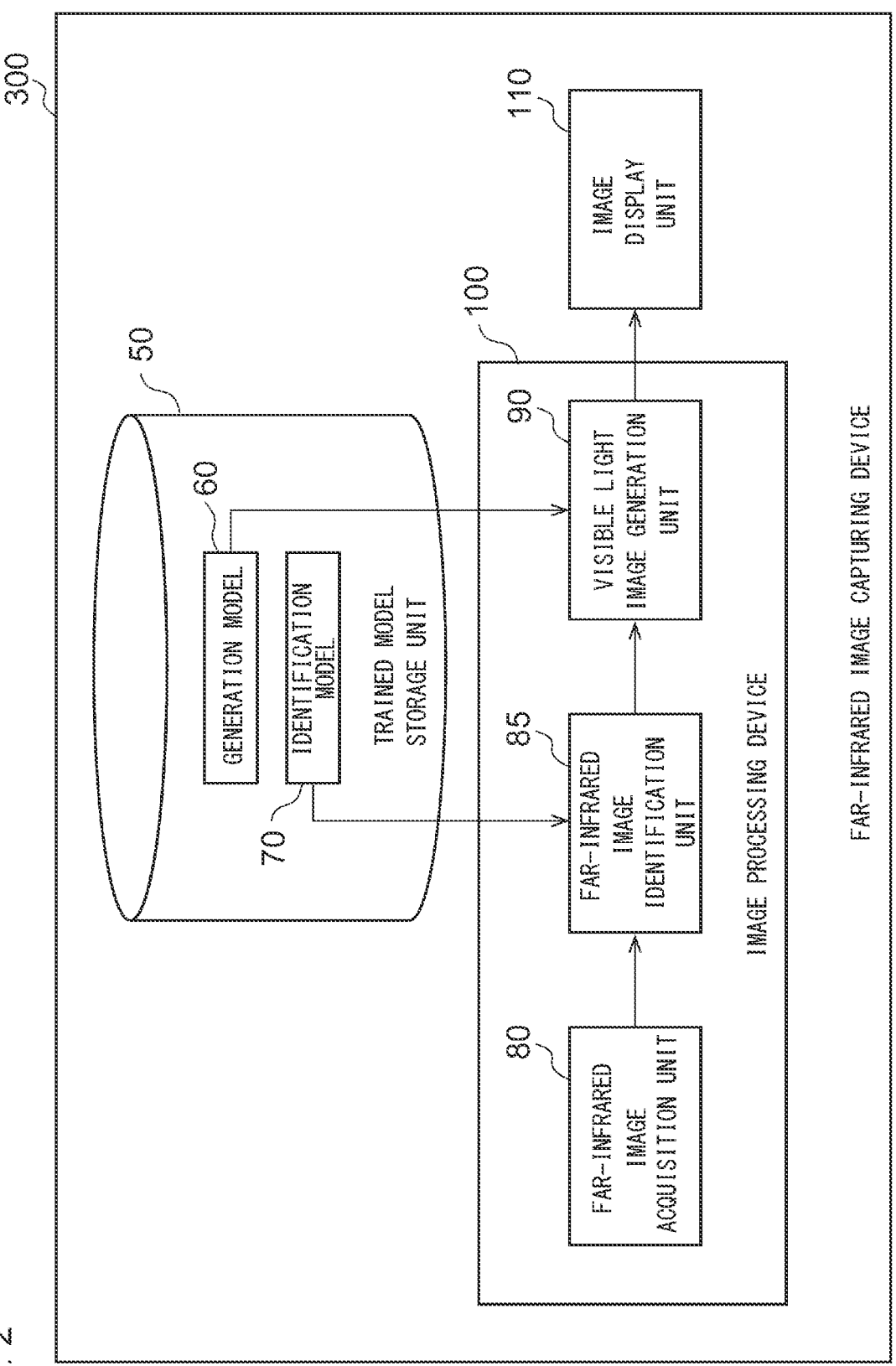
FIG. 2 is a configuration diagram of a far-infrared image capturing device according to the first embodiment.

FIG. 2 is a configuration diagram of a far-infrared image capturing device 300 according to the first embodiment. The far-infrared image capturing device 300 includes a trained model storage unit 50, an image processing device 100, and an image display unit 110. The image processing device 100 includes a far-infrared image acquisition unit 80, a far-infrared image identification unit 85, and a visible light image generation unit 90. The trained model storage unit 50 has the same configuration as the trained model storage unit 50 in FIG. 1, and a generation model 60, which is a trained model for a visible light image generative network generated by the visible light image generation model training unit 40, and an identification model 70, which is a trained model for a far-infrared image discriminative network, are stored therein.

The far-infrared image acquisition unit 80 acquires a far-infrared image captured by the far-infrared image capturing device 300 and supplies the acquired far-infrared image to the far-infrared image identification unit 85. The far-infrared image identification unit 85 inputs the far-infrared image acquired by the far-infrared image acquisition unit 80 to the identification model 70 read from the trained model storage unit 50 and identifies whether or not the acquired far-infrared image is a far-infrared image captured in the first predetermined time zone. The far-infrared image identification unit 85 supplies the far-infrared image to the visible light image generation unit 90 if the acquired far-infrared image is a far-infrared image captured in the first predetermined time zone and does not supply the far-infrared image to the visible light image generation unit 90 if the acquired far-infrared image is not a far-infrared image captured in the first predetermined time zone.

The visible light image generation unit 90 inputs the far-infrared image supplied by the far-infrared image identification unit 85 into the generation model 60 read from the trained model storage unit 50 so as to generate a visible light image. Thereby, the visible light image generation unit 90 generates a visible light image if the far-infrared image is determined to be a far-infrared image captured in the first predetermined time zone by the far-infrared image identification unit 85 and does not generate a visible light image if the far-infrared image is determined not to be a far-infrared image captured in the first predetermined time zone.

As described above, the generation model 60 is a trained model of a visible light image generative network trained by machine learning of the far-infrared image in the first predetermined time zone and the visible light image in the second predetermined time zone as training data using a generative adversarial network and generates a visible light image in the second predetermined time zone from the far-infrared image in the first predetermined time zone.

The image display unit 110 displays the visible light image generated by the visible light image generation unit 90. The image display unit 110 may display the far-infrared image acquired by the far-infrared image acquisition unit 80. The image display unit 110 may display either one of a far-infrared image and a visible light image, may display both the far-infrared image and the visible light image, or may display a composite of the far-infrared image and the visible light image.

As described above, under conditions such as backlighting, fog, haze, night, etc., when a visible light camera cannot capture an image of an object, a far-infrared camera capable of capturing a blurred image of the object can be used to capture an outline part of the object, and a GAN-trained visible light image generative network can be used to generate a detailed part of the object from a far-infrared image including the captured blurred image of the object. In this way, it is possible to obtain a visible light image that allows the object to be confirmed clearly or in detail even for a far-infrared image.

More specifically, a generation model 60 is generated, which is a trained model of a visible light image generative network that generates a visible light image when a far-infrared image is input. By inputting a far-infrared image in a time zone during which an image of the object cannot be captured clearly or in detail by a visible light camera (e.g., night time zone) into the generation model 60, a visible light image can be acquired in which the object can be confirmed clearly or in detail.

An identification model 70 is generated, which is a trained model of a far-infrared image discriminative network that identifies when a far-infrared image is input whether or not the input far-infrared image is a far-infrared image in the first predetermined time zone. A highly accurate far-infrared image identified by the identification model 70 as being a far-infrared image in the first predetermined time zone is provided to the generation model 60, which is a trained model of the visible light image generative network. The visible light image generative network can convert a far-infrared image to a visible light image with high accuracy if the far-infrared image has a similar probability density distribution of feature values to a learned far-infrared image.

Figures 3A, 3B:
FIG. 3A and FIG. 3B are diagrams explaining predetermined time zones.

FIG. 3A and FIG. 3B are diagrams explaining predetermined time zones. The first predetermined time zone is a night time zone, and the second predetermined time zone is a day time zone. As shown in FIG. 3A, the day time zone may be from 9:00 a.m. to 3:00 p.m., and the night time zone may be from 9:00 p.m. to 3:00 a.m. the next day. As shown in FIG. 3B, the day time zone may be from 6:00 a.m. to 6:00 p.m., and the night time zone may be from 6:00 p.m. to 6:00 a.m. the next day.

Visible light cameras can clearly capture images of objects such as a person during the day time zone but cannot clearly capture images of objects such as a person during the night time zone. On the other hand, although far-infrared cameras cannot capture the detailed texture of object such as a person even during the night time zone, far-infrared cameras can capture the shape of objects clearly.

Thus, the first predetermined time zone is a time zone where an image of the object can be clearly captured by a visible light camera, and the second predetermined time period is a time zone where an image of the object cannot be clearly captured by a visible light camera.

Regarding the visible light image captured by a visible light camera, the quality of the visible light image that is used as training data can be improved by limiting not only the time zone but also the season, weather, location, etc. For example, a visible light image captured on a sunny day in March or a visible light image captured on a predetermined floor is used. For the visible light image captured by the visible light camera, conditions such as time zone, season, weather, and location are preferably selected such that the amount of visible light falls within a predetermined range.

On the other hand, regarding the far-infrared image captured by a far-infrared camera, the quality of the far-infrared image that is used as training data can be also improved by limiting not only the time zone but also the season, weather, location, etc., in the same way. For the far-infrared image captured by the far-infrared camera, conditions such as time zone, season, weather, and location are preferably selected such that the air temperature falls within a predetermined range.

By using the visible light image and the far-infrared image with a limited time zone, season, weather, and location and having the images learned using a GAN, highly accurate trained models of the visible light image generative network and the far-infrared image discriminative network can be generated.

FIG. 4 is a flow chart explaining a procedure for performing machine learning on a generation model 60 for the visible light image generative network and an identification model 70 for the far-infrared image discriminative network by the machine learning device 200 of FIG. 1. An explanation will be given on the assumption that the first predetermined time zone represents nighttime, and the second predetermined time zone represents daytime, as an example.

The far-infrared image training data acquisition unit 20 acquires a nighttime far-infrared image from the training data storage unit 10 (S10). The visible light image training data acquisition unit 30 acquires a daytime visible light image from the training data storage unit 10 (S20).

The visible light image generation model training unit 40 generates a generation model 60 for generating the daytime visible light image from the nighttime far-infrared image by machine-learning the nighttime far-infrared image and the daytime visible light image as training data using a GAN (S30).

The visible light image generation model training unit 40 generates an identification model 70 for identifying whether or not the far-infrared image is a far-infrared image captured at nighttime by machine-learning the nighttime far-infrared image and the daytime visible light image as training data using a GAN (S40). In the figure, S40 is illustrated as being executed after S30. However, in general, S30 and S40 are mutually repeated in a GAN.

Figure 5:
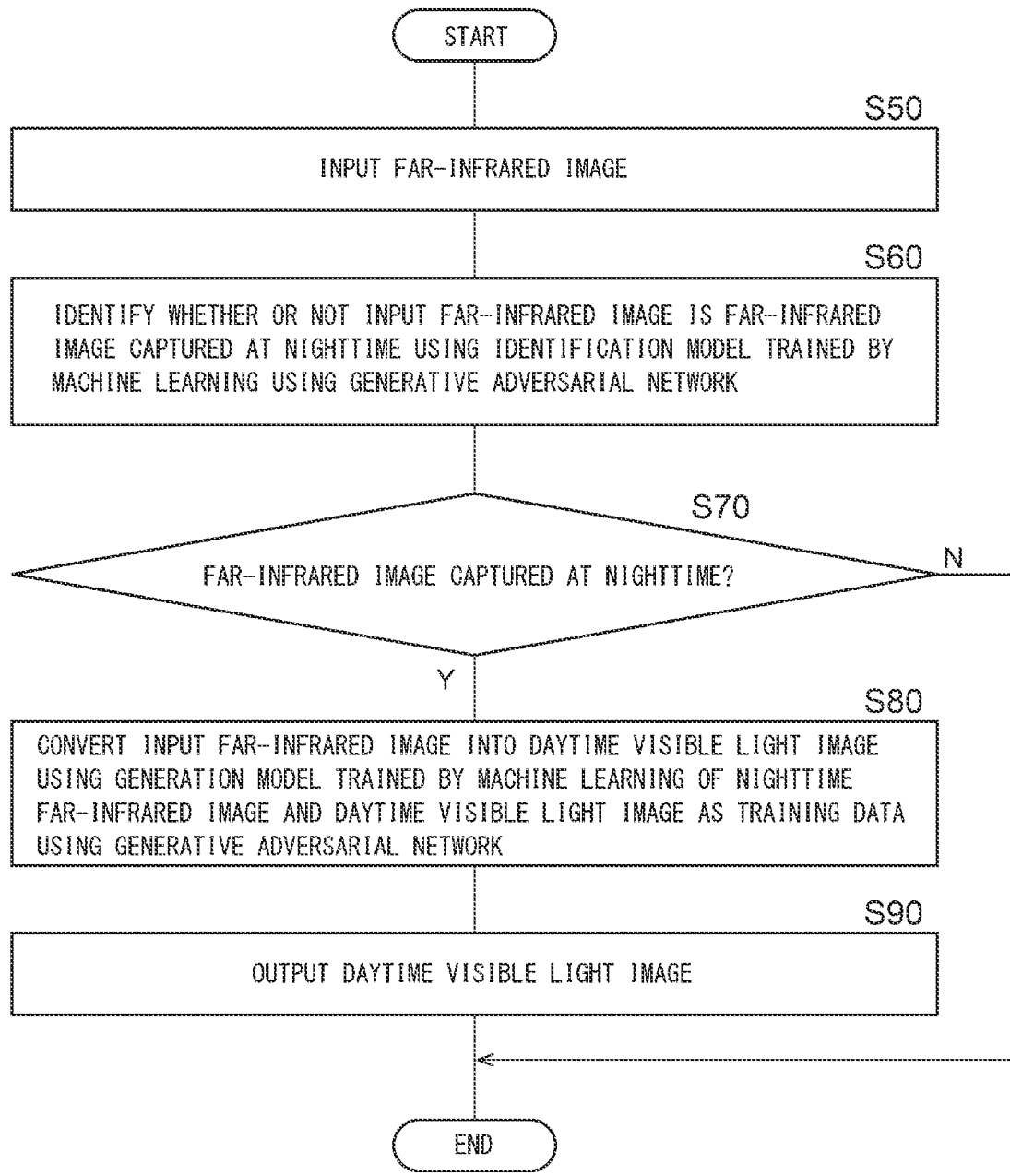
FIG. 5 is a flow chart explaining a procedure for converting a far-infrared image into a visible light image by an image processing device of FIG. 2 using the generation model for a visible light image generative network and the identification model for a far-infrared image discriminative network.

FIG. 5 is a flow chart explaining a procedure for converting a far-infrared image into a visible light image by the far-infrared image capturing device 300 of FIG. 2 using the generation model 60 for the visible light image generative network and the identification model 70 for the far-infrared image discriminative network. An explanation will be given on the assumption that the first predetermined time zone represents nighttime, and the second predetermined time zone represents daytime, as an example.

A far-infrared image captured by the far-infrared image capturing device 300 is input (S50).

Using the identification model 70 on which machine learning has been performed using a GAN, whether or not the input far-infrared image is a far-infrared image captured at nighttime is identified (S60).

If the input far-infrared image is a far-infrared image captured at nighttime (Y in S70), the step proceeds to step S80, and if the input far-infrared image is not a far-infrared image captured at nighttime (N in S70), the procedure is ended.

Using the generation model 60 trained by machine learning of the nighttime far-infrared image and the daytime visible light image as training data using the GAN, the input far-infrared image is converted into a daytime visible light image (S80).

The generated daytime visible light image is output (S90). The output daytime visible light image is used for object detection and the like.

According to the first embodiment, by training a visible light image generative network for generating a visible light image from a far-infrared image using a nighttime far-infrared image and a daytime visible light image as training data using a GAN and converting a far-infrared image into a visible light image by a visible light image generative network trained using the GAN, a clear image can be obtained regardless of whether it is day or night.

By installing the generation model 60, which is a trained model of a visible light image generative network that generates a visible light image when a far-infrared image is input, in the far-infrared image capturing device 300, it is possible to realize the far-infrared image capturing device 300 that allows for the constant recognition of a person or animal regardless of the time zone just like in a visible light image.

Further, by installing the identification model 70, which is a trained model of a far-infrared image discriminative network that identifies upon the input of a far-infrared image whether or not the input far-infrared image is a far-infrared image in the first predetermined time zone, in the far-infrared image capturing device 300, it is possible to improve the accuracy of the generation of visible light images by the generation model 60.

(First Exemplary Variation)

Since the configuration and operation of training data and a visible light image generation model training unit 40 are different from those of the machine learning device 200 according to the first embodiment, only the differences will be explained. In the first exemplary variation, training data for a visible light image in the second predetermined time zone represents an image of the same composition captured of the same object at the same location as training data for a far-infrared image in the first predetermined time zone, and the far-infrared image in the first predetermined time zone and the visible light image in the second predetermined time zone form a pair. Therefore, the visible light image generation model training unit 40 uses Pix2Pix as a GAN learning method.

The visible light image generation model training unit 40 pairs the training data of the far-infrared image in the first predetermined time zone with the training data of the visible light image in the second predetermined time zone for machine learning using Pix2Pix so as to generate a generation model 60, which is a trained model of the visible light image generative network that generates a visible light image upon the input of a far-infrared image. In the explanation of Pix2Pix above, Group X includes far-infrared images and Group Y includes visible light images.

Further, the visible light image generation model training unit 40 generates an identification model 70, which is a trained model of the far-infrared image discriminative network that identifies when a far-infrared image is input whether or not the input far-infrared image is a far-infrared image in the first predetermined time zone. In the explanation of Pix2Pix above, Group Y includes far-infrared images and Group X includes visible light images.

If a large number of images of the same object captured at the same location with the same composition can be prepared, the accuracy of the generation of visible light images by the generation model 60 of the visible light image generative network, which generates a visible light image upon the input of a far-infrared image, can be improved.

(Second Exemplary Variation)

Since the configuration and operation of training data and a visible light image generation model training unit 40 are different from those of the machine learning device 200 according to the first embodiment, only the differences will be explained. In the second exemplary variation, training data for a visible light image represents a visible light image of the same object captured at the same place with projected light so as to have the same composition in the same time zone as the training data of the far-infrared image in the first predetermined time zone.

The visible light image generation model training unit 40 pairs the training data of the far-infrared image in the first predetermined time zone with the training data of the visible light image obtained with projected light in the first predetermined time zone and machine-learns the pair of training data using a GAN so as to generate a generation model 60, which is a trained model of the visible light image generative network that generates a visible light image upon the input of a far-infrared image.

Here, Pix2Pix may be used as the GAN. If Pix2Pix is used, the training data for a far-infrared image and the training data for a visible light image are desirably those obtained at the same time as much as possible. This can be achieved by capturing the training data for the far-infrared image immediately before the projection of light and capturing the training data for the visible light image immediately after the projection of light. In the explanation of Pix2Pix above, Group X includes far-infrared images and Group Y includes visible light images.

If a large number of images of the same object captured at almost the same time and at the same location with the same composition can be prepared, the accuracy of the generation of visible light images by the generation model 60 of the visible light image generative network, which generates a visible light image upon the input of a far-infrared image, can be improved.

Second Embodiment

In the second embodiment, at least one of the first and second predetermined time zones is divided into multiple time zones, the visible light image generation model training unit 40 learns a generation model 60 and an identification model 70 for each divided time zone, and the far-infrared image identification unit 85 and the visible light image generation unit 90 switch between the generation model 60 and the identification model 70 for use depending on the time zone.

FIG. 6A and FIG. 6B are diagrams explaining divided predetermined time zones. The first predetermined time zone is a night time zone, and the second predetermined time zone is a day time zone. As shown in FIG. 6A, the night time zone may be divided into two time zones with different far-infrared image features. The accuracy of the identification can be improved by using an identification model 70 suitable for the image-capturing time zone of the acquired far-infrared image after switching by the far-infrared image identification unit 85.

As shown in FIG. 6B, the day time zone may be divided into three time zones with different visible light image features, and the night time zone may be divided into two time zones with different far-infrared image features. The far-infrared image identification unit 85 and the visible light image generation unit 90 switch between the identification model 70 and the generation model 60 to use the one that matches the image-capturing time zone, thereby achieving the diversification of the visible light image that is generated while improving the accuracy of the identification and the accuracy of the generation.

Further, although the same as in the first embodiment applies to the time zones, the accuracy of the far-infrared image identification unit 85 and the visible light image generation unit 90 may be improved by preparing an identification model 70 and a generation model 60 for each season, weather, and place.

Third Embodiment

A machine learning device 200 according to the third embodiment differs from the machine learning device 200 according to the first embodiment in the configuration and operation of a visible light image training data acquisition unit 30, and the configuration and operation of the rest are the same. The explanation of the configuration and operation same as those of the first embodiment will be omitted as appropriate.

Although visible light cameras can clearly capture images of people and license plates in clear daylight, video images of people or license plates that are not anonymized are problematic from the standpoint of personal information protection. Thus, in the machine learning device 200 according to the third embodiment, a visible light image that has undergone a concealing process so that a predetermined object cannot be recognized is used as training data.

The visible light image training data acquisition unit 30 of the machine learning device 200 performs a concealing process so that a predetermined object cannot be recognized in a visible light image acquired from the training data storage unit 10, and supplies the training data of the visible light image that has undergone the concealing process so that a predetermined object cannot be recognized to the visible light image generation model training unit 40.

In the same way as the first embodiment, the visible light image generation model training unit 40 generates a trained visible light image generation model that generates a visible light image in the second predetermined time zone from a far-infrared image in the first predetermined time zone. However, the concealing process is performed on the visible light image used for learning as training data so that the predetermined object cannot be recognized. Therefore, the generation model 60 of the visible light image generative network that is generated as a result of the learning converts a far-infrared image into a visible light image that has undergone the concealing process so that a predetermined object cannot be recognized. It is possible to obtain an easy-to-see image in which personal information is protected and portrait rights are protected, both at night and in the daytime.

When the visible light image generation unit 90 generates a visible light image from a far-infrared image using the generation model 60 in the image processing device 100, the resultant is a visible light image that has undergone a concealing process so that a predetermined object cannot be recognized, and it is thus not necessary to perform a concealing process on the predetermined object in the generated visible light image.

It is assumed that the predetermined object is an object for personal information protection or portrait right protection, and examples thereof include a head including a person's face and a license plate of a car or motorcycle. Although it is assumed that the predetermined object is a head including a person's face or a license plate of a car or motorcycle in this example, the predetermined object may be any object for personal information protection or portrait right protection, and for stronger protection of rights, the predetermined object may be the entire body of a person, a car, or a motorcycle.

A pixel value in the area of the predetermined object is replaced with a predetermined pixel value (e.g., black) to make the predetermined object unrecognizable. The pixel value of the predetermined object is replaced with the predetermined pixel value here. However, as long as the predetermined object can be made unrecognizable, the predetermined object may be replaced with an imaginary person, car, etc., drawn by computer graphics (CG). Further, the predetermined pixel value may be changed to red, blue, green, or the like for each image.

For example, whether or not the predetermined object can be recognized is determined by using a trained object recognition model that has been trained to be able to recognize the predetermined object. As another method, a person may visually determine whether or not the predetermined object can be recognized.

(First Exemplary Variation)

As another example of the concealing process for making a predetermined object unrecognizable, a predetermined size may be defined for each predetermined object that prevents the accurate recognition of the predetermined object, and the concealing process may be performed using as training data only visible light images in which all the predetermined objects have respective predetermined sizes or smaller defined for each predetermined object.

(Second Exemplary Variation)

As another example of the concealing process that makes a predetermined object unrecognizable, a concealing process may be performed by replacing the predetermined object with a predetermined pixel value (e.g., black) so as to make the predetermined object unrecognizable if the predetermined object is equal to or larger than a predetermined size defined for the predetermined object.

In the third embodiment and the exemplary variations thereof, a far-infrared image and a visible light image that have undergone a concealing process to make a predetermined object unrecognizable are machine-learned as training data using a GAN so as to generate a trained model of a visible light image generative network for generating a visible light image that has undergone a concealing process to make a predetermined object unrecognizable upon the input of a far-infrared image. This allows for the generation of easy-to-see visible light images excluding a predetermined object while complying with personal information protection and portrait rights protection.

Further, since visible light images generated by a GAN is pseudo-images generated from the features of learned images, predetermined objects can be easily anonymized.

Pre-training of a trained model of the visible light image generative network makes it unnecessary to perform a concealing process on predetermined objects at the time of operation.

Fourth Embodiment

Far-infrared cameras are resistant to fog and haze and can vaguely capture images of people or animals even in places with no light source, e.g., at night time. However, far-infrared cameras have low accuracy in object detection and object recognition due to their inability to capture the details of objects such as people and animals and their lack of color information. Accordingly, in the fourth embodiment, by training a visible light image generative network for generating a visible light image from a far-infrared image using a GAN and performing object detection in a visible light image generated from a far-infrared image using a generation model of the visible light image generative network, the accuracy of the object detection is improved.

Figure 7:
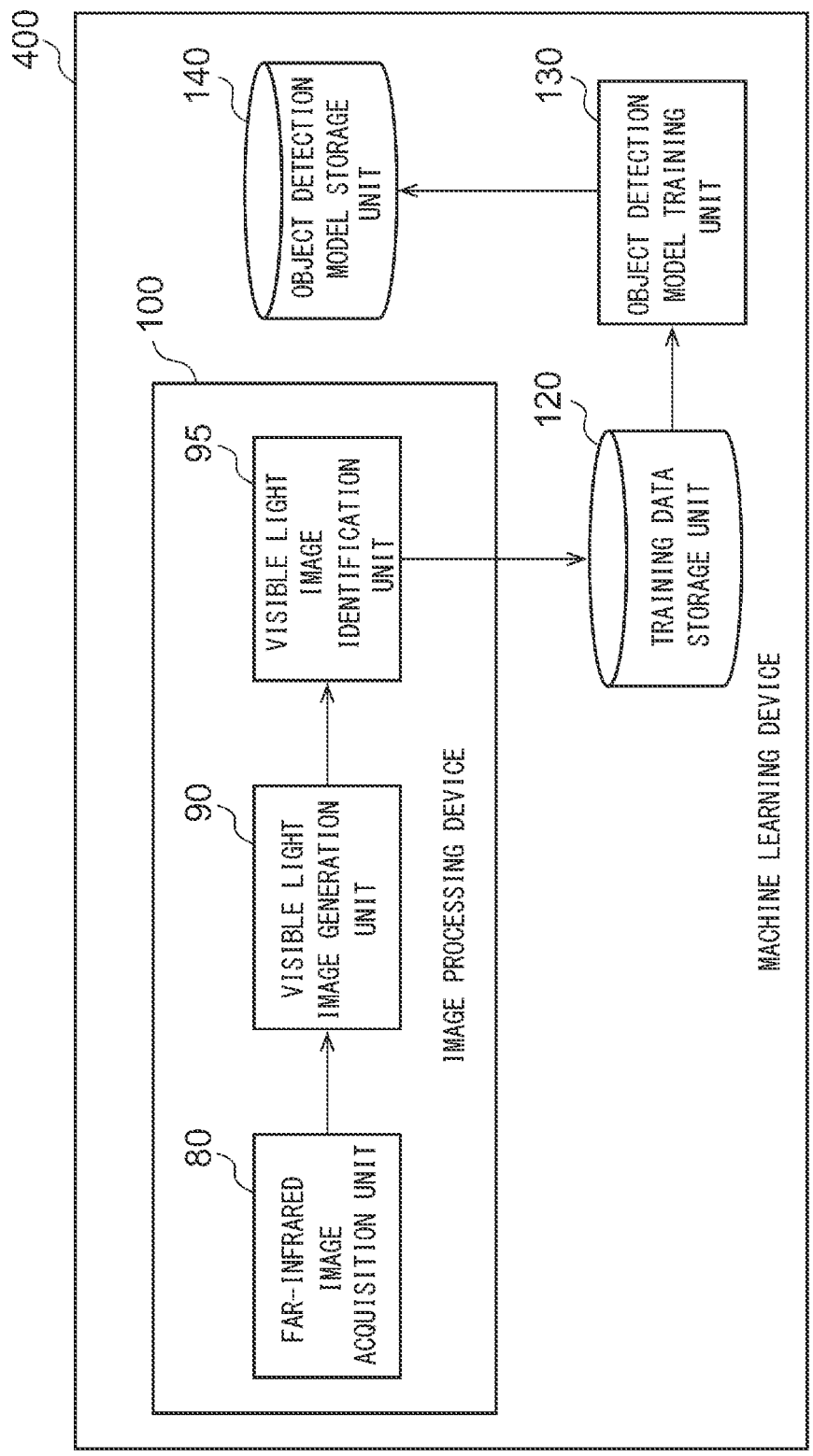
FIG. 7 is a configuration diagram of a machine learning device according to the fourth embodiment.

FIG. 7 is a configuration diagram of a machine learning device 400 according to the fourth embodiment. The machine learning device 400 includes an image processing device 100, a training data storage unit 120, an object detection model training unit 130, and an object detection model storage unit 140. The image processing device 100 includes a far-infrared image acquisition unit 80, a visible light image generation unit 90, and a visible light image identification unit 95. Although not shown in FIG. 7, the machine learning device 200 of FIG. 1 is further included in the present embodiment separately from the machine learning device 400.

In the fourth embodiment, using a GAN, the visible light image generation model training unit 40 of FIG. 1 performs machine learning on a visible light image generative network that generates a visible light image upon the input of a far-infrared image and a visible light image discriminative network that identifies upon the input of a visible light image whether the input visible light image is real or fake as a visible light image in the second predetermined time zone, using a far-infrared image in the first predetermined time zone and a visible light image in the second predetermined time zone as training data.

As a result of learning through a GAN, a generation model 60, which is a trained model of the visible light image generative network, and an identification model 75, which is a trained model of the visible light image discriminative network, are generated. The generation model 60 is a trained model of the visible light image generative network that generates a visible light image in the second predetermined time zone from a far-infrared image in the first predetermined time zone, and the identification model 75 is a trained model of the visible light image discriminative network that identifies whether or not the visible light image is real or fake as a visible light image captured during the first predetermined time zone. The visible light image generation model training unit 40 stores a generation model 60, which is a trained model of the visible light image generative network, and an identification model 75, which is a trained model of the visible light image discriminative network in the trained model storage unit 50. The visible light image generation model training unit 40 supplies the generation model 60 to the visible light image generation unit 90. The visible light image generation model training unit 40 supplies the identification model 75 to the visible light image identification unit 95.

The far-infrared image acquisition unit 80 acquires a far-infrared image and supplies the acquired far-infrared image to the visible light image generation unit 90.

The visible light image generation unit 90 inputs a far-infrared image supplied from the far-infrared image acquisition unit 80 into a generation model, which is a trained model of the visible light image generative network, so as to generate a visible light image, and supplies the generated visible light image to the visible light image identification unit 95.

The visible light image identification unit 95 inputs the visible light image supplied from the visible light image generation unit 90 into an identification model, which is a trained model of the visible light image generative network, identifies whether the input visible light image is real or fake, and stores a visible light image identified as real in the training data storage unit 120 but does not store a visible light image identified as fake in the training data storage unit 120.

If the input visible light image is identified as real, the input visible light image is determined to be normal. If the input visible light image is identified as fake, the input visible light image is determined to be not normal.

The training data storage unit 120 accumulates the input visible light image as training data while specifying a tag (e.g., object name) and the position and size of a bounding box for one or more objects in the visible light image. For example, the generation of the training data is ended upon the accumulation of 1000 objects, and the object detection model training unit 130 is instructed to start training. Examples of tags to be assigned to objects include human faces, pedestrians, cars, bicycles, etc.

When sufficient training data has been accumulated in the training data storage unit 120 and the object detection model training unit 130 receives an instruction to start training, the object detection model training unit 130 performs machine learning on an object detection model using the training data accumulated in the training data storage unit 120. As an example, the object detection model uses You Only Look Once (YOLO) in which a convolutional neural network (CNN), which is a typical model for object detection, is used. The object detection model training unit 130 stores the object detection model on which machine learning has been performed in the object detection model storage unit 140.

Figure 8:
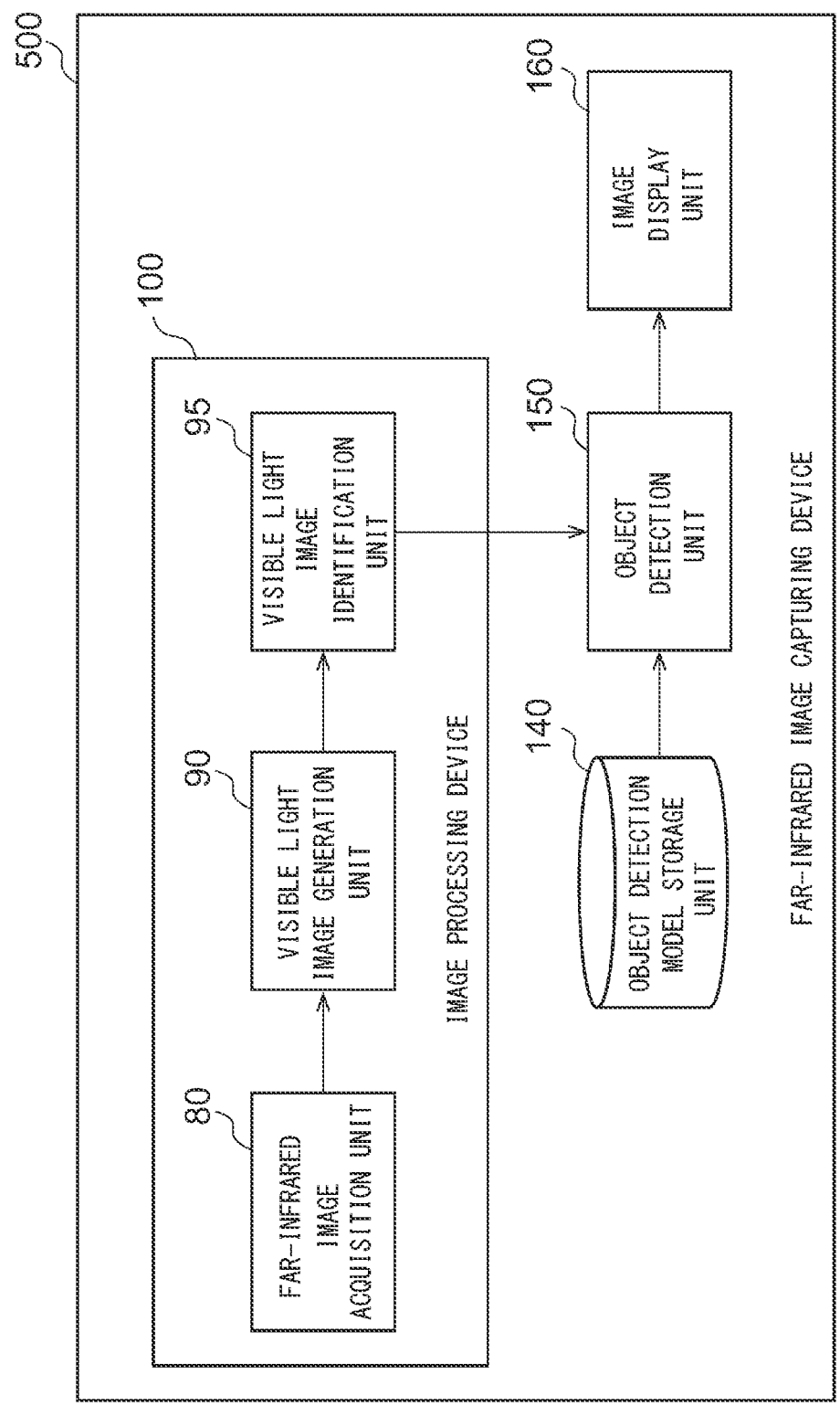
FIG. 8 is a configuration diagram of a far-infrared image capturing device according to the fourth embodiment.

FIG. 8 is a configuration diagram of a far-infrared image capturing device 500 according to the fourth embodiment. The far-infrared image capturing device 500 includes an image processing device 100, an object detection model storage unit 140, an object detection unit 150, and an image display unit 160. The image processing device 100 includes a far-infrared image acquisition unit 80, a visible light image generation unit 90, and a visible light image identification unit 95 just like the image processing device 100 of the machine learning device 400 of FIG. 7. The object detection model storage unit 140 has the same configuration as the object detection model storage unit 140 of FIG. 7, and stores object detection models trained by the object detection model training unit 130.

The far-infrared image acquisition unit 80 acquires a far-infrared image captured by the far-infrared image capturing device 500 and supplies the acquired far-infrared image to the visible light image generation unit 90.

The visible light image generation unit 90 inputs a far-infrared image supplied from the far-infrared image acquisition unit 80 into a generation model, which is a trained model of the visible light image generative network, so as to generate a visible light image, and supplies the generated visible light image to the visible light image identification unit 95.

The visible light image identification unit 95 inputs the visible light image supplied from the visible light image generation unit 90 into an identification model, which is a trained model of the visible light image generative network, identifies whether the input visible light image is real or fake, and supplies a visible light image identified as real to the object detection unit 150 but does not supply a visible light image identified as fake to the object detection unit 150.

By inputting the input visible light image into the object detection model stored in the object detection model storage unit 140, the object detection unit 150 detects objects in the visible light image. The input visible light image and detected object information are supplied to the image display unit 160. The image display unit 160 displays a composite of the visible light image, tags, and bounding boxes on the screen.

As described above, under conditions such as backlighting, fog, haze, night, etc., when a visible light camera cannot capture an image of an object, a far-infrared camera capable of capturing a blurred image of the object can be used to capture an outline part of the object, and a GAN-trained visible light image generative network can be used to generate a detailed part of the object from a far-infrared image including the captured blurred image of the object. This allows for highly accurate object recognition and object detection even for far-infrared images.

Figure 9:
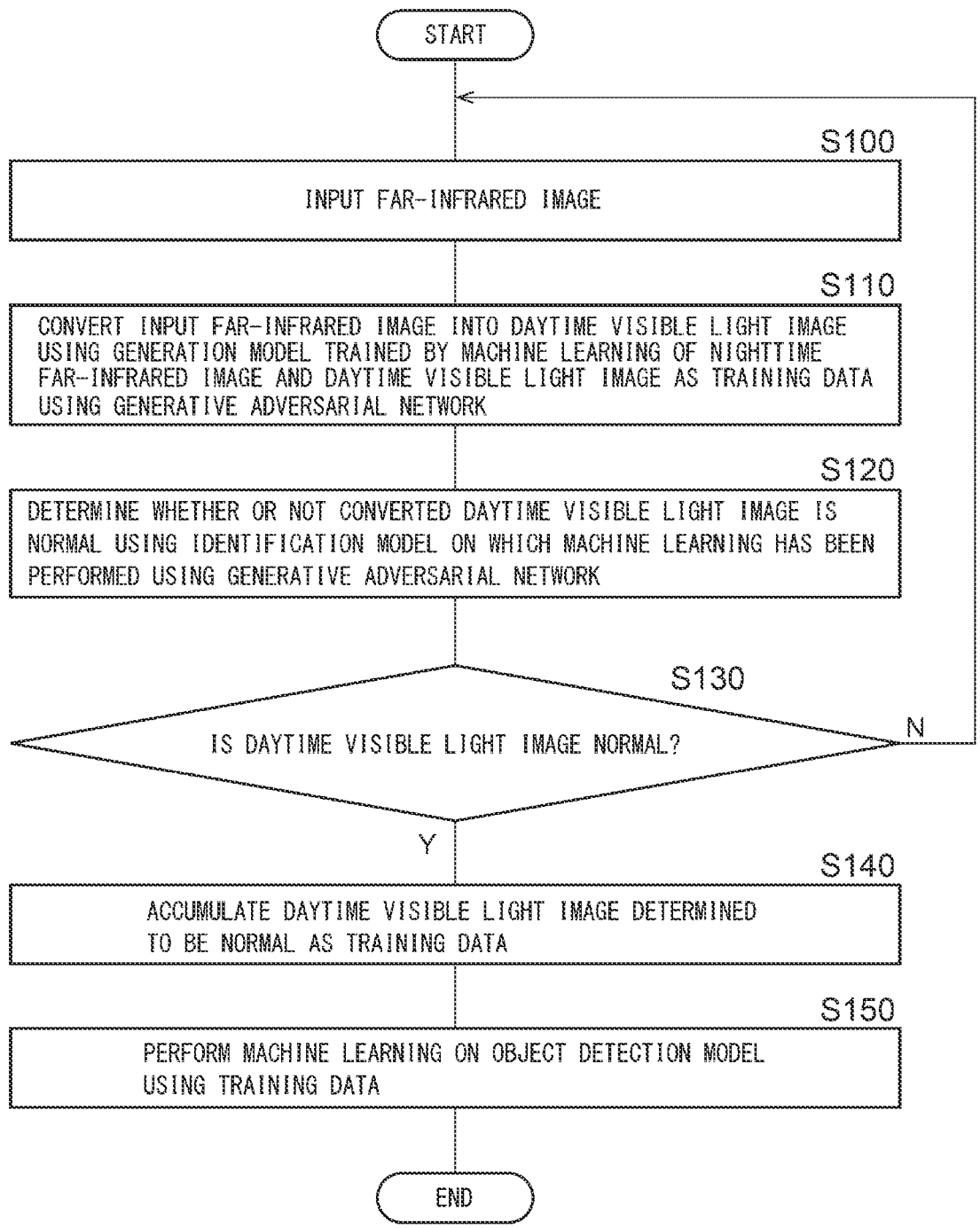
FIG. 9 is a flow chart explaining a procedure for converting a far-infrared image into a visible light image and machine-learning an object detection model using the visible light image as training data by the machine learning device of FIG. 7.

FIG. 9 is a flow chart explaining a procedure for converting a far-infrared image into a visible light image and machine-learning an object detection model using the visible light image as training data by the machine learning device 400 of FIG. 7. An explanation will be given on the assumption that the first predetermined time zone represents nighttime, and the second predetermined time zone represents daytime, as an example.

The far-infrared image acquisition unit 80 inputs a far-infrared image (S10).

Using a generation model trained by machine learning of a nighttime far-infrared image and a daytime visible light image as training data using the GAN, the visible light image generation unit 90 converts the input far-infrared image into a daytime visible light image (S110).

The visible light image identification unit 95 determines whether or not the converted daytime visible light image is normal using an identification model of the visible light image discriminative network on which machine learning has been performed using the GAN (S120). If the converted daytime visible light image is normal (Y in S130), the step proceeds to step S140. If the converted daytime visible light image is not normal (N in S130), the step returns to step S100.

The visible light image identification unit 95 accumulates the daytime visible light image determined to be normal as training data in the training data storage unit 120 (S140).

The object detection model training unit 130 performs machine learning on an object detection model using the daytime visible light image accumulated as training data (S150).

Figure 10:
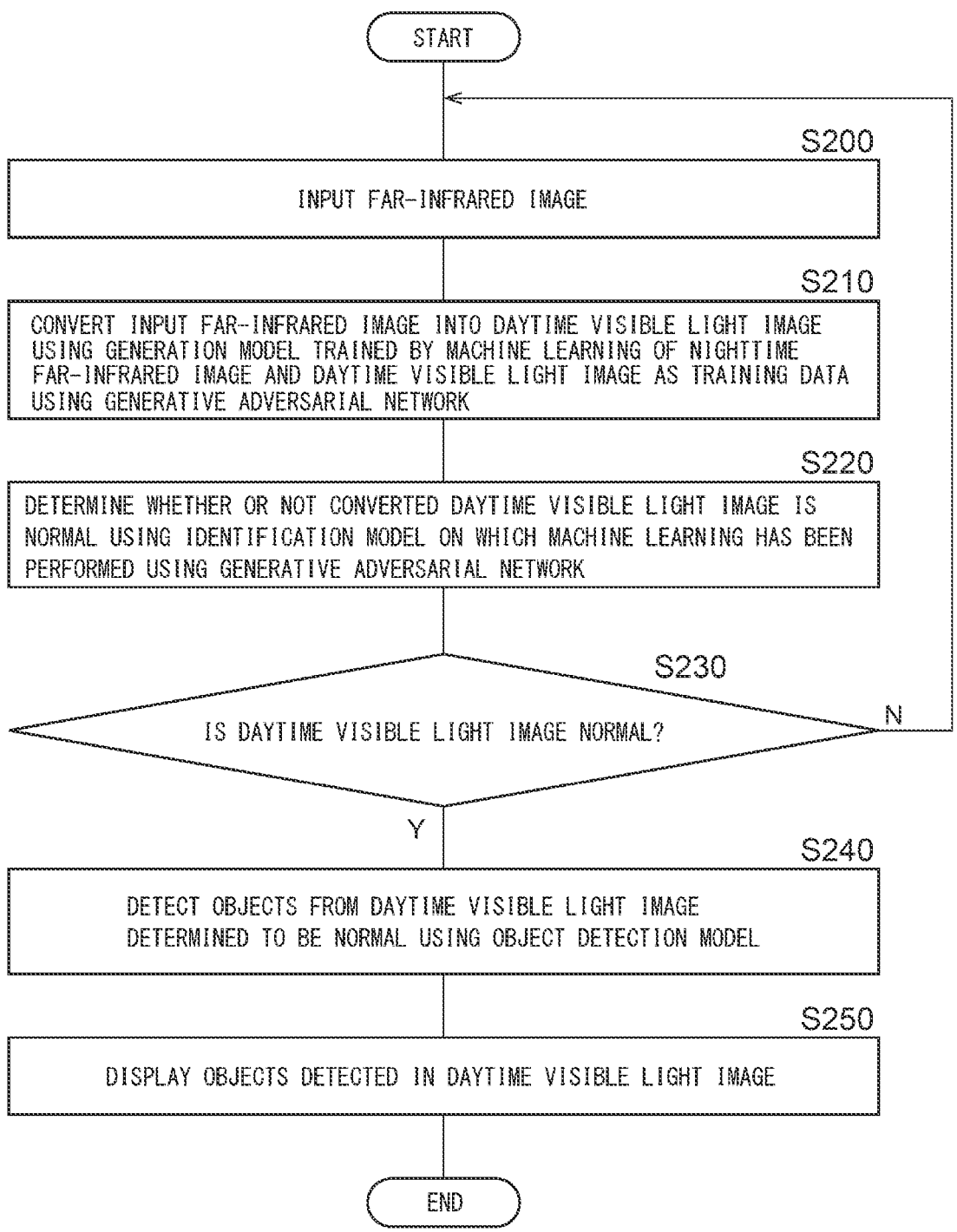
FIG. 10 is a flow chart explaining a procedure for converting a far-infrared image into a visible light image and detecting an object from the visible light image by the far-infrared image capturing device of FIG. 8.

FIG. 10 is a flow chart explaining a procedure for converting a far-infrared image into a visible light image and detecting an object from the visible light image by the far-infrared image capturing device 500 of FIG. 8.

The far-infrared image acquisition unit 80 inputs a far-infrared image captured by the far-infrared image capturing device 500 (S200).

Using the generation model trained by machine learning of the nighttime far-infrared image and the daytime visible light image as training data using the GAN, the visible light image generation unit 90 converts the input far-infrared image into a daytime visible light image (S210).

The visible light image identification unit 95 determines whether or not the converted daytime visible light image is normal using an identification model of the visible light image discriminative network on which machine learning has been performed using the GAN (S220). If the converted daytime visible light image is normal (Y in S230), the step proceeds to step S240. If the converted daytime visible light image is not normal (N in S230), the step returns to step S200.

The object detection unit 150 detects objects from the daylight visible light image determined to be normal using the object detection model (S240). The image display unit 160 displays objects detected in the daylight visible light image (S250).

(First Exemplary Variation)

In the fourth embodiment, a visible light image identification unit 95 is installed in the image processing device 100. However, the visible light image identification unit 95 may be omitted. Further, a visible light image identification unit 95 may be installed only in the image processing device 100 of the machine learning device 400. Alternatively, a visible light image identification unit 95 may be installed only in the image processing device 100 of the far-infrared image capturing device 500.

(Second Exemplary Variation)

In the far-infrared image capturing device 500 of FIG. 8, it is assumed that the object detection unit 150 detects objects only from the visible light image identified as real by the visible light image identification unit 95. However, the object detection unit 150 may detect objects also from a visible light image identified as fake by the visible light image identification unit 95. At this time, the threshold B of the object detection reliability when the visible light image identification unit 95 identifies the image as fake is set to be higher than the threshold A of the object detection reliability when the visible light image identification unit 95 identifies the image as real. In other words, when the visible light image identification unit 95 identifies the image as fake, if the object detection reliability is not higher than the threshold B (>A), it is not considered that objects have been detected. In this way, the recall rate can be also increased while increasing the precision rate.

When a high recall rate is required, the difference between the threshold B of the object detection reliability when the visible light image identification unit 95 identifies the image as fake and the threshold A of the object detection reliability when the visible light image identification unit 95 identifies the image as real may be reduced. When a high precision rate is required, the difference between the threshold B of the object detection reliability when the visible light image identification unit 95 identifies the image as fake and the threshold A of the object detection reliability when the visible light image identification unit 95 identifies the image as real may be increased.

Further, if the visible light image identification unit 95 outputs the probability of being real, the threshold of the object detection reliability may be decreased as the probability of being real becomes higher, and the threshold of the object detection reliability may be increased as the probability of being real becomes lower. The object detection reliability is an evaluation value of the probability that an object to be detected is included in a certain area.

According to the fourth embodiment, object recognition and object detection are performed after generating a visible light image in which accurate object recognition is easy from a far-infrared image in which accurate object recognition is difficult, thereby allowing for highly accurate object recognition and object detection even for far-infrared images.

Further, by training the object detection network according to the identification result from the trained model of the discriminative network, the object detection network can be trained to improve its accuracy.

Further, by making an inference using the object detection network according to the identification result from the trained model of the discriminative network, the accuracy of the object detection network can be improved. Further, changing the threshold of the object detection reliability according to the identification probability of the trained model of the discriminative network allows for easy adaptation to a wide variety of applications.

Further, since a visible light camera is no longer necessary and object recognition and object detection can be performed with high accuracy using only a far-infrared camera, the device is suitable for downsizing and weight reduction.

The various processes of the image processing device 100, the machine learning device 200, the fa-infrared image capturing device 300, the machine learning device 400, and the far-infrared image capturing device 500 explained above can be realized as a device using hardware such as a CPU and memory. Alternatively, the processes can be implemented by firmware stored in a read-only memory (ROM), a flash memory, etc., or by software on a computer, etc. The firmware program or the software program may be made available on, for example, a computer readable recording medium. Alternatively, the programs may be transmitted to and/or received from a server via a wired or wireless network. Still alternatively, the programs may be transmitted and/or received in the form of data transmission over terrestrial or satellite digital broadcast systems.

Described above is an explanation of the present invention based on the embodiments. The embodiments are intended to be illustrative only, and it will be obvious to those skilled in the art that various modifications to constituting elements and processes could be developed and that such modifications are also within the scope of the present invention.

What is claimed is:

1. An image processing device comprising:
a far-infrared image acquisition unit that acquires a far-infrared image;
a visible light image generation unit that inputs the acquired far-infrared image into a generation model trained by machine learning of a far-infrared image in a first predetermined time zone and a visible light image in a second predetermined time zone as training data by a generative adversarial network, and generates a visible light image in the second predetermined time zone; and
a far-infrared image identification unit that inputs the acquired far-infrared image into an identification model that identifies whether or not the far-infrared image generated by the machine learning using the generative adversarial network is a far-infrared image captured in the first predetermined time zone,
wherein the visible light image generation unit generates the visible light image if the far-infrared image is determined to be a far-infrared image captured in the first predetermined time zone by the far-infrared image identification unit and does not generate the visible light image if the far-infrared image is determined not to be a far-infrared image captured in the first predetermined time zone.

2. The image processing device according to claim 1, wherein the far-infrared image in the first predetermined time zone and the visible light image in the second predetermined time zone that serve as the training data for the generation model have the same composition.

3. A machine learning device comprising:
a far-infrared image acquisition unit that acquires a far-infrared image;
a visible light image generation unit that inputs the acquired far-infrared image into a generation model trained by machine learning of a far-infrared image in a first predetermined time zone and a visible light image in a second predetermined time zone as training data by a generative adversarial network, and generates a visible light image in the second predetermined time zone;
an object detection model training unit that performs machine learning on an object detection model using the generated visible light image as training data; and
a visible light image identification unit that inputs the generated visible light image into an identification model that identifies whether or not the visible light image generated by the machine learning using the generative adversarial network is normal, wherein
the object detection model training unit uses the generated visible light image as the training data if the generated visible light image is determined to be normal by the visible light image identification unit and does not use the generated visible light image as the training data if the generated visible light image is determined to be not normal.

\* \* \* \* \*